United States Patent
Quantrille et al.

[11] Patent Number: 5,431,991
[45] Date of Patent: Jul. 11, 1995

[54] PROCESS STABLE NONWOVEN FABRIC

[75] Inventors: Thomas E. Quantrille, Simpsonville; Jared A. Austin, Greer, both of S.C.; Scott L. Gessner, Encinitas, Calif.

[73] Assignee: Fiberweb North America, Inc., Simpsonville, S.C.

[21] Appl. No.: 119,104

[22] PCT Filed: Jan. 22, 1993

[86] PCT No.: PCT/US93/00566
§ 371 Date: Sep. 17, 1993
§ 102(e) Date: Sep. 17, 1993

Related U.S. Application Data

[63] Continuation-in-part of Ser. No. 825,016, Jan. 24, 1992, Pat. No. 5,334,446.

[51] Int. Cl.⁶ .................. B32B 5/12; B32B 7/00; B32B 31/08; D03D 3/00
[52] U.S. Cl. .................. 428/109; 428/110; 428/138; 428/113; 428/299; 428/296; 428/286; 428/287; 428/298; 156/163; 156/164; 156/229
[58] Field of Search ........... 428/109, 152, 198, 283, 428/284, 287, 296, 299, 326, 903, 107, 113, 114, 230, 247, 255; 156/163, 164, 229

[56] References Cited

U.S. PATENT DOCUMENTS

| | | | |
|---|---|---|---|
| 2,982,680 | 5/1961 | Ellis et al. | 428/152 |
| 3,519,530 | 7/1970 | Struble, Jr. | 428/152 |
| 3,597,299 | 8/1971 | Thomas et al. | 428/152 |
| 3,600,262 | 8/1971 | Frank | 161/79 |
| 3,765,997 | 10/1973 | Dunning | 428/172 |
| 3,769,119 | 10/1973 | Mizell et al. | 428/172 |
| 3,775,231 | 11/1973 | Thomas | 428/154 |
| 4,302,495 | 11/1981 | Marra | 428/110 |
| 4,413,623 | 11/1983 | Pieniak | 156/229 |
| 4,525,407 | 6/1985 | Ness | 156/229 |
| 4,542,060 | 9/1985 | Yoshida et al. | 428/287 |
| 4,551,378 | 11/1985 | Carey, Jr. | 428/198 |
| 4,606,964 | 8/1986 | Wideman | 428/152 |
| 4,636,419 | 1/1987 | Madsen et al. | 156/294 |
| 4,681,801 | 7/1987 | Eian et al. | 428/284 |
| 4,731,276 | 3/1988 | Manning et al. | 428/284 |
| 4,734,311 | 3/1988 | Sokolowski | 156/494 |
| 4,775,579 | 10/1988 | Hagy et al. | 428/284 |
| 4,786,549 | 11/1988 | Richards | 428/229 |
| 4,847,134 | 7/1989 | Fahrenkrug et al. | 428/284 |
| 4,863,779 | 9/1989 | Daponte | 428/225 |
| 4,970,104 | 11/1990 | Radwanski | 428/152 |
| 4,977,011 | 12/1990 | Smith | 428/292 |
| 4,984,584 | 1/1991 | Hansen et al. | 428/152 |
| 5,200,246 | 4/1993 | Sabee | 428/113 |

FOREIGN PATENT DOCUMENTS 0007802  2/1980  European Pat. Off.

*Primary Examiner*—George F. Lesmes
*Assistant Examiner*—Kathryne E. Shelborne
*Attorney, Agent, or Firm*—Bell, Seltzer, Park & Gibson

[57] ABSTRACT

The invention provides elastic fabrics which are substantially non-extensible in the machine direction and have substantial elastic properties in the cross-machine direction. The process stable fabrics of the invention include a net and a fibrous layer which are secured together. The net is composed of a plurality of continuous machine direction strands and a plurality of cross-direction strands. The machine direction strands are substantially non-extensible and the cross-direction strands are substantially elastic. The fabrics of the invention can be manufactured and processed more readily than fabrics which are elastic in both the machine direction and the cross-machine direction.

19 Claims, 3 Drawing Sheets

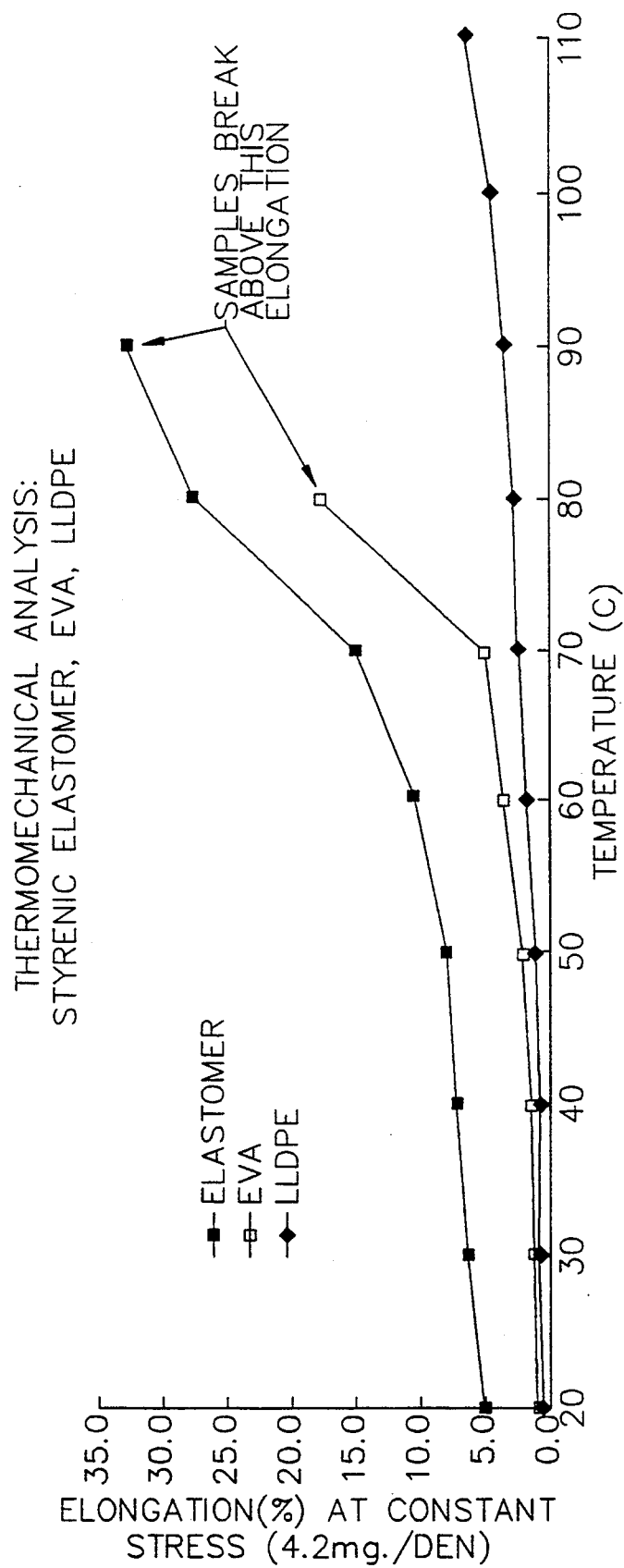

PROCESS STABLE NONWOVEN FABRIC

CROSS-REFERENCE TO RELATED APPLICATIONS

This application is a continuation-in-part of application U.S. Ser. No. 07/825,016 filed Jan. 24, 1992 for "Composite Elastic Nonwoven Fabric" by Thomas E. Quantrille et al. now U.S. Pat. No. 5,334,446.

FIELD OF THE INVENTION

The invention relates to process stable composite elastic nonwoven fabrics and to processes for producing them. More specifically, the invention relates to process stable composite nonwoven elastic fabrics having desirable strength, conformability, and stretch and recovery properties, and which can be more readily manufactured and processed using existing textile equipment as compared to prior nonwoven fabrics.

BACKGROUND OF THE INVENTION

Nonwoven elastic fabrics have been the subject of considerable attention and effort. Elastic fabrics are desirable for use in bandaging materials, garments, diapers, supportive clothing and personal hygiene products because of their ability to conform to irregular shapes and to allow more freedom of body movement than fabrics with limited extensibility.

Elastomeric materials have been incorporated into various fabric structures to provide stretchable fabrics. In many instances, such as where the fabrics are made by knitting or weaving, there can be a relatively high cost associated with the fabric. In cases where the fabrics are made using nonwoven technologies, the fabric can suffer from insufficient strength and only limited stretch and recovery properties.

Elastomers used to fabricate elastic fabrics often have an undesirable rubbery feel. This is particularly true with thermoplastic elastomers rather than cross-linked elastomers. When these materials are used in composite nonwoven fabrics, the hand and texture of the fabric can be perceived by the user as sticky or rubbery and therefore undesirable.

Nonwoven fabrics having thermoplastic elastomers incorporated into the fabric structure can be extremely difficult to process and to manufacture. For example, tension control during fabric manufacture and/or during downstream processing can be extremely critical. A small change in tension can result in stretching or recovery of the fabric which can lead to a non-uniformly manufactured product. Tension control is even more aggravated when heating is required, for example, during fabric drying, adhesive application, lamination, thermal bonding or other thermal treatment. When subjected to heat and tension, the fabric can stretch and otherwise undergo greater distortion than when the fabric is at room temperature. In addition, thermoplastic elastomers can lose elastic properties when stressed at elevated temperatures and allowed to cool fully or partially while stressed, and/or the thermoplastic fibers and filaments are apt to break, thereby causing the elastic fabric to lose a portion or all of its elastic properties. Still further, when elastic fabrics are wound into rolls, stretching of the fabrics can occur during the winding process and the fabric can lose elastic properties during its subsequent storage due to the phenomenon of creep.

U.S. Pat. No. 4,775,579 to Hagy, et al. discloses desirable composite elastic nonwoven fabrics containing staple textile fibers intimately hydroentangled with an elastic web or elastic net. One or more webs of staple textile fibers and/or wood pulp fibers can be hydroentangled with an elastic net according to the disclosure of this invention. The resulting composite fabric exhibits characteristics comparable to those of knit textile cloth and possesses superior softness and extensibility properties. The rubbery feel traditionally associated with elastomeric materials can be minimized or eliminated in these fabrics.

U.S. Pat. No. 4,413,623 to Pieniak discloses a laminated structure such as a disposable diaper which can incorporate an elastic net into portions of the structure. The elastic net can be inserted in a stretch position between first and second layers of the structure and bonded to the layers while in the stretch condition. Subsequent relaxation of the elastic net can result in gathering of the structure.

U.S. Pat. No. 4,525,407 to Ness discloses elastic fabrics which include an elastic member which may be an elastic net intermittently bonded to a substrate which prior to stretching is less easily extensible than the elastic member. The non-elastic member is bonded to the elastic member and the entire composite is rendered elastic by stretching and relaxation.

U.S. Pat. No. 4,606,964 to Wideman discloses a bulk composite web which can be prepared by bonding a gatherable web to a differentially stretched elastic net. Subsequent relaxation of the differentially stretch net is said to result in gathering of the fabric.

The various problems associated with thermoplastic elastomeric materials, as discussed previously, render many of these and other composite elastic fabrics difficult to manufacture and process. There are problems with tension control, elongation under the tension induced by converting machines, irregular cut length, poor tracking, blocking, and similar problems. In the past, these problems have been overcome or minimized only with substantial difficulty. To minimize the problem of machine direction stretching during fabric converting and/or forming, typical approaches have been to either cool the thermoplastic elastomer to a temperature below its glass transition temperature or to make "heat activated" materials that are rigid, but then shrink and become elastomeric when heated. These steps are often required to process the material under acceptable tension levels even at ambient temperatures. Alternative process modifications have required extremely exact tension control mechanisms; but these do not consistently eliminate problems during normal fabric processing.

SUMMARY OF THE INVENTION

The invention provides process stable composite elastic fabrics which can be readily processed on existing textile apparatus without requiring special tension control mechanisms and without substantial harm to the elastic properties of the fabric. The fabrics can be subjected to heat during the process of manufacturing the fabrics or thereafter without destruction of elastic properties. Thus, elastic fabrics of the invention can be manufactured in a more convenient and straightforward manner and can be processed thereafter with less restrictions and/or fabric damage than prior elastic fabrics.

The process stable composite elastic fabrics of the invention are substantially non-extensible in the machine direction and have substantial elastic properties in the cross-machine direction. Thus, the process stable fabrics of the invention can be stressed in the machine direction without substantial fabric stretching and without requiring specialized processes and/or apparatus to compensate for elastic stretching. Moreover, because elastomeric components of the fabric are not substantially stretched when the fabric is stressed in the machine direction, thermal treatments can be more readily applied to the fabric without substantial fabric harm as a result of combined thermal and stress effects.

The process stable composite elastic fabrics of the invention have a predetermined width and an indeterminate length which is substantially greater than the width of the fabric. The width of the fabric defines the fabric's cross-machine direction and the length of the fabric defines the machine direction of the fabric. The composite nonwoven fabric includes at least one fibrous layer and a net combined with the fibrous layer. The net is composed of a plurality of continuous machine direction strands oriented in substantially the machine direction of the fabric and a plurality of cross-direction continuous strands oriented in substantially the cross direction of the fabric. The machine direction strands are substantially non-extensible and preferably are substantially non-extensible under applied stress at temperatures of up to 70° C. or higher. The cross-direction strands comprise a substantial amount of a thermoplastic elastomer, preferably about 20 wt. %, more preferably at least about 50 wt. %, such that the net is elastic in the cross-direction. In one preferred embodiment, the net is combined with the fibrous web by hydroentangling. The net can alternatively be combined with the fibrous web by adhesive or thermal bonding. Advantageously, the fibrous web comprises staple fibers including polyolefins, polyesters, nylon and the like, and/or cotton, wool and wood pulp fibers. These fibers can provide desirable aesthetic qualities to the composite fabric. Additionally or alternatively the fibrous web can comprise a spunbond or a meltblown web.

Advantageously, the machine direction continuous strands employed in the net component of the composite fibrous web are formed of a crystalline polymer such as a crystallizable polyolefin material which is strong and which readily adheres to the thermoplastic elastomer material used in the cross machine direction strands of the net. In one particularly preferred embodiment of the invention, the net is formed from polyolefin strands oriented in the machine direction and the cross machine direction strands are formed from a thermoplastic styrenic elastomer.

As compared to nonwoven fabrics which are either non-elastic or fully elastic, the composite fabrics of the invention have various advantages and benefits. As compared to non-elastic fabrics, the fabrics of the invention are advantageous in providing elastic properties in the cross-machine direction. As compared to conventional elastic nonwoven fabrics-which are elastic in both the machine direction and the cross-machine direction, the fabrics of the invention provide significant benefits and advantages both in terms of their manufacture and their subsequent use. The fabrics of the invention can be manufactured and processed without the need for specialized tension control. When thermally treated while being processed in the machine direction, the fabrics of the invention typically do not lose elastic properties because the elastic filaments are not subjected to tensioning. The fabrics of the invention can be readily cut without deformation during the cutting process so that the cut length can be more accurately controlled. Similarly the fabric of the invention allows for more accurate treatment and control in other converting processes. The fabrics of the invention can be readily wound and stored in roll form under various environmental conditions without subjecting the elastic components of the fabric to stresses which would result in creep of the fabric. In addition, the fabrics of the invention can provide Significant aesthetic benefits including differential drape, curl and shear properties which are not readily provided in fully elastic and fully nonelastic composite fabrics.

BRIEF DESCRIPTION OF THE DRAWINGS

In the drawings which form a portion of the original disclosure of the invention:

FIG. 5 illustrates the results of thermomechanical analysis conducted on filaments composed of styrenic elastomers, EVA polymer and LLDPE polymer.

DETAILED DESCRIPTION OF THE INVENTION

In the following detailed description of the invention, specific preferred embodiments of the invention are described to enable a full and complete understanding of the invention. It will be recognized that it is not intended to limit the invention to the particular preferred embodiments described, and although specific terms are employed in describing the invention, these terms are used for the purpose of illustration and not for the purpose of limitation. It will be apparent that the invention is susceptible to variations and changes within the spirit of the teachings herein.

Figure 1:
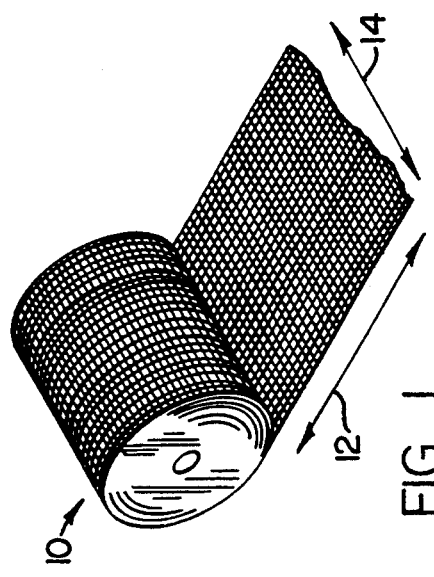
FIG. 1 illustrates in perspective view a net in roll form which can be used in producing fabrics of the invention.

FIG. 1 illustrates an elastomeric net 10 having a plurality of substantially continuous strands or filaments oriented in the machine direction of the fabric as indicated by arrow 12 and a plurality of substantially continuous filaments or strands oriented in the cross-machine direction, that is, the width direction of the fabric as indicated by arrow 14. The strands oriented in the machine direction are substantially non-extensible strands while the strands in the cross machine direction are substantially elastic and preferably comprise a thermoplastic elastomer. As used herein and only for purposes of this application, the term "elastic" is used to mean strands and/or fabrics capable of substantially complete recovery, i.e. greater than about 75%, preferably greater than about 90% recovery, when stretched in an amount of about 10% at room temperature expressed as:

$$\% \ recovery = (L_s - L_r)/(L_s - L_o) \times 100$$

where: $L_s$ represents stretched length; $L_r$ represents recovered length measured one minute after recovery; and $L_o$ represents original length of material.

As used herein and only for the purposes of this application, the term "substantially non-extensible" is used to mean filaments and/or strands which, at 25° C. exhibit an extensibility of 2% or less, preferably about 1% or less when subjected to an applied stress of 5 mg/denier which is a stress based on stresses applied to a fabric by fabric conversion apparatus. In preferred embodiments of this invention, substantially non-extensible filaments and strands have an extensibility of less than about 5% at 70° C. under an applied stress of 5 mg/den.

Generally, it is desirable that the number of strands per inch in each of the machine and cross-machine directions of the net range from between about 2 and about 30 strands per inch preferably from 5 to about 20 strands per inch although greater numbers of filaments can be employed where desirable. Typically, the elastomeric net 10 will have a basis weight ranging from about 15 grams per square meter to about 200 grams per square meter, more preferably from about 50 to about 90 grams per square meter, and can employ filaments having diameters ranging from about 50 to about 600 microns, preferably from about 150 to about 400 microns.

The elastic net 10 can be prepared by any of various well known processes including the process disclosed in U.S. Pat. No. 4,636,419, issued Jan. 13, 1987 to Madsen, et al., incorporated herein by reference. In general, the elastic net is made by extruding a plurality of substantially non-extensible polymeric strands in the machine direction while simultaneously or thereafter extruding and joining to said machine direction filaments, a plurality of elastic polymeric strands oriented substantially in the cross machine direction.

The elastic material making up the strands in the cross-machine direction of the net normally comprise at least one thermoplastic elastomer. Suitable thermoplastic elastomers include the diblock, triblock, radial and star copolymers based on polystyrene (S) and unsaturated or fully hydrogenated rubber blocks. The rubber block can consist of butadiene (B), isoprene (I), or the hydrogenated version, ethylene-butylene (EB). For example, S-B, S-I, S-EB, as well as S-B-S, S-I-S, S-EB-S linear block copolymers can be used. Typically when used one or more of the diblock copolymers are blended with the triblock or radial copolymer elastomers. Preferred thermoplastic elastomers of this type can include the KRATON polymers sold by Shell Chemical Company or the VECTOR polymers sold by DEXCO. Other elastomeric thermoplastic polymers include polyurethane elastomeric materials such as ESTANE sold by BF Goodrich Company; polyester elastomers such as HYTREL sold by E. I. Du Pont De Nemours Company; polyetherester elastomeric materials such as ARNITEL sold by Akzo Plasticst and polyetheramide elastomeric materials such as PEBAX sold by ATO Chemie Company; and the like.

The elastic strands in the cross-machine direction of the elastic net 10 can also be prepared from blends of thermoplastic elastomers with other polymers such as polyolefin polymers, e.g. blends of Kraton polymers with polyolefins such as polypropylene and polyethylene, and the like. These polymers can provide lubrication and decrease the melt viscosity, allow for lower melt pressures and temperatures and/or increase throughput, and provide better bonding properties too. In a preferred embodiment of the invention, such other polymers can be included in the blend as a minor component, for example in an amount of between about 5% by weight up to 50% by weight, preferably from about 10 to about 30% by weight of the mixture. Suitable thermoplastic polymers, include, in addition to the polyolefin polymers, poly(ethylene-vinyl acetate) polymers having an ethylene content of up to about 50% by weight, preferably between 15 and 30% by weight and copolymers of ethylene and acrylic acid or esters thereof, such as poly(ethylene-methyl acrylate) or poly(ethylene-ethyl acrylate) wherein the acrylate acid or ester component ranges from about 5 to about 50% by weight, preferably from about 15 to about 30% by weight. In addition polystyrene and poly(alpha-methyl styrene) can be used.

The machine direction substantially non-extensible strands constitute a non-elastic polymeric material including any of the various well known filament-forming polymers, such as polyolefins including polyethylene, polypropylene, linear low density polyethylene (LLDPE); polyesters such as polyethylene terephthalate; polyamides such as nylon-6 and nylon-6,6; copolymers, blends of such materials and the like. Preferably the non-elastic polymer is a crystalline material which provides a filament with a high tenacity and a relatively sharp melting point. Advantageously, the substantially non-extensible strands in the machine direction are composed of a material which adheres readily to the elastic strands in the cross-machine direction. In this regard it is desirable that there be substantial bonding between the strands in the machine direction and the strands in the cross-machine direction. Generally, a polyolefin material is preferably used for the machine direction strands when the cross-machine direction strands are styreno-based elastomeric materials. Nylon continuous machine direction can be advantageously employed in combination with polyetheramide elastomeric cross-machine direction strands. Polyester-based strands advantageously can be used as machine direction strands in combination with polyetherester elastomeric cross-machine direction strands.

In one preferred embodiment of the invention, the machine direction substantially non-extensible strands can comprise an adherence promoting additive to improve the adherence of the machine direction strands to the cross-machine direction strands. Preferred additives to improve adherence include poly(ethylene-vinyl acetate) polymers having an ethylene content of up to about 50% by weight, preferably between about 15 and about 30% by weight, and copolymers of ethylene and acrylic acid or esters thereof, such as poly(ethylene-methyl acrylate) or poly(ethyl acrylate) wherein the acrylic acid or ester component ranges from about 5 to about 50% by weight, preferably from about 15 to 30% by weight. These materials are preferably included in the machine direction strands in an amount of between about 2 and about 50% by weight, preferably between about 10 and about 30% by weight depending on the primary component of the strand. In addition other materials such as plasticizers, tackifiers, talc, and the like can be compounded into the resin at low levels to promote bonding. As indicated previously, the machine direction strands are preferably stable under applied stress at high temperatures. However, if such additives are included in too great an amount the thermal stability of the machine direction strands can suffer.

Figure 2:
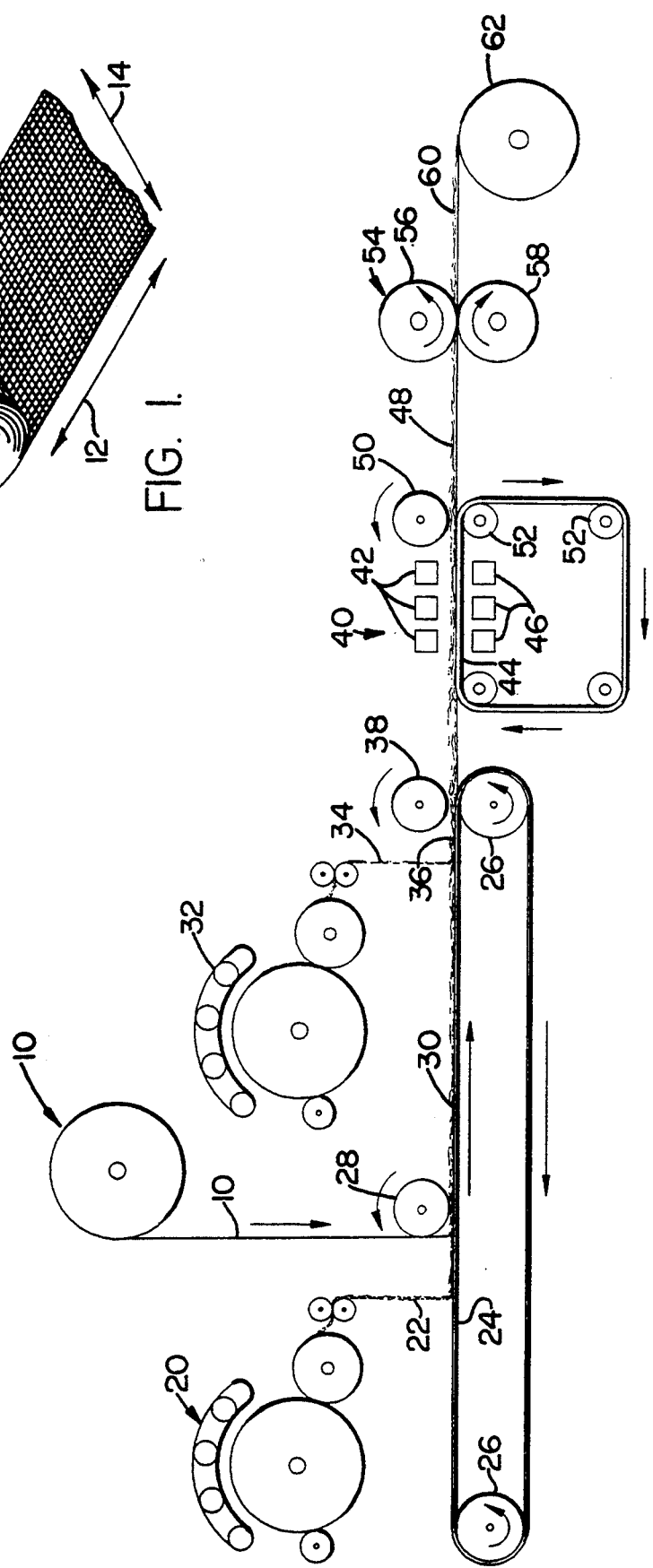
FIG. 2 is a schematic illustration of one preferred process for producing a fabric in accordance with the invention.

FIG. 2 illustrates one preferred process for forming a composite fabric of the invention. A carding apparatus 20 forms a first carded layer 22 onto forming screen 24. Carded fibrous layer 22 can comprise any of various well-know synthetic or natural fibers, and in one preferred embodiment of the invention, also includes binder fibers in an amount of between about 5% and about 50% by weight. The web 22 is moved by forming screen 24 in the machine direction by rolls 26.

A conventional supply system thereafter applies the elastomeric net 10 onto the moving carded layer 22. As discussed previously, the elastomeric net 10 includes spaced apart machine direction and cross machine direction strands which intersect to form apertures. Although it is preferred that the net have a substantially regular, rectangular shape, irregular geometry nets such as diamond-shaped nets and the like can be used wherein the non-elastic strands are oriented primarily in the machine direction and elastic strands are oriented primarily in the cross machine direction. A roll 28 applies tension to the two-layered structure 30 which is formed from the combination of the carded layer 22 and the net layer 10. The two layer structure is advanced in the machine direction by forming screen 24.

A second carding apparatus 32 deposits a second carded fibrous layer 34 comprising synthetic and/or natural fibers onto the two layer structure 30 to thereby form a three-layer composite structure 36 consisting of a carded web/elastomeric net/carded web. The synthetic and/or natural fibers making up carded web 34 can be the same or different as compared to the fibers in carded web 22. The three-layer composite web 36 is conveyed in the machine direction by the combination of forming screen 24 and roll 38. It will be apparent to the skilled artisan that the composite structure including net 10 is subjected to tension between the forming rolls 28 and 38. Because the machine direction strands in the net 10 are substantially non-extensible strands, the tension applied between rolls 28 and 38 does not result in substantial stretching of the net 10 and hence there is little or no stretching of the composite elastic structure 36.

The composite structure 36 is thereafter conveyed in the machine direction as shown in FIG. 1 to a hydroentangling station 40 wherein a plurality of manifolds 42, each including one or more rows of fine orifices, direct high pressure Jets of liquid through composite web 36 to intimately hydroentangle the fibers in each of the layers 22 and 34 with each other and with net 10. As a result of the hydroentangling treatment, at least a portion of the fibers in each of the carded layers 22 and 34 preferably extend through apertures in the net and into the carded layer on the other side of the net.

The hydroentangling station 40 is constructed in a conventional manner as known to the skilled artisan and as described, for example, in U.S. Pat. No. 3,485,706 to Evans, which is hereby incorporated by reference. As known to the skilled artisan, fiber hydroentanglement is accomplished by jetting liquid, typically water, supplied at a pressure from about 200 psig up to about 1,800 psig or greater, to form fine, essentially columnar liquid streams. The high pressure liquid streams are directed to at least one surface of the composite layered structure. The composite is supported on a foraminous support screen 44 which can have a pattern to form a nonwoven structure with a pattern or with apertures, or the screen 44 can be designed and arranged to form a hydraulically entangled composite which is not patterned or apertured. The laminate can be passed through a second hydraulic entangling station schematically illustrated in FIG. 2 by manifolds 46, to enable hydraulic entanglement on the other side of the composite web fabric.

During the hydraulic entanglement treatment, the fibers in the carded layer or layers are forced into and/or through the elastomeric net 10, thereby securing the carded fibrous layer to the elastomeric net. Preferably, the hydroentangling treatment is sufficient to force the fibers present in at least one or the layers 22 and 34 into and/or through the apertures in the elastomeric net 10. More preferably, the hydroentangling treatment is sufficient to force at least portion of the fibers in both carded layers 22 and 34 into and/or through the apertures in the elastomeric net.

The elastomeric web 10 remains in a substantially planer arrangement during the hydroentangling treatment. Thus, the machine direction and cross-machine direction filaments, respectively, of the elastomeric net undergo little if any movement in the cross-sectional direction, i.e. in the Z direction within the web. Thus, the elastomeric net remains within a discrete interior cross-sectional portion of the composite web.

A condensed, hydraulically entangled composite web 48 is removed from the hydroentangling station 40 via roll 50 which cooperates with forming wire 44 and forming web rolls 52. The tension applied to the composite web 48 by rolls 50 and 52 does not result in substantial stretching of the elastomeric composite 48 because the machine direction strands of the net 10 are substantially non-extensible.

The web 48 exiting the hydroentangling station is thereafter preferably dried at a conventional drying station (not shown) and thereafter may be thermally treated at an optional thermal treatment station 54, shown in FIG. 2 as heated calender rolls 56 and 58. The optional thermal treatment station 54 is used when binder fibers or another binder material is present in the composite web 48. The operating temperature of the heated rolls 56 and 58 is adjusted to a surface temperature such that the binder fibers or other binder materials present in the composite web 48 are thermally activated to bind the composite web 48 into a coherent, unitary structure. In accordance with the present invention, the thermal treatment can be more readily carried out because the elastomeric strands in the net 10 are not subjected to tension during the thermal treating process. Preferably, the operating temperature of the rolls 56 and 58 is maintained below a temperature which would cause thermal degradation or melting of the elastomeric materials in the net 10.

The composite web 60 is removed from the nip of rolls 56 and 58 and is wound by conventional means onto roll 62. The composite elastic web 60 can be stored on roll 62 without substantial harm to the fabric due to the phenomenon of creep; that is, deformation that is time dependent and is exhibited by many elastomeric materials subjected to a continuing load. In many cases, creep deformation may not be recoverable following removal of the applied load. With the fabric 60 stored on roll 62, the elastomeric filaments of net 10 are only found in the cross-machine direction of the net and therefore are not subjected to stress during storage on roll form. The fabric 60 stored on roll 62 may be immediately or later passed to end use manufacturing processes, for example, for use in bandages, diapers, disposable undergarments, personal hygiene products, and the like.

The method illustrated in FIG. 2 is susceptible to numerous preferred variations. For example, although the schematic illustration of FIG. 2 shows carded webs being formed directly during the in-line process, it will be apparent that the carded webs can be preformed and supplied as rolls of preformed webs. Similarly, although the elastomeric net is shown being supplied as a roll of preformed net, the net can be formed directly in-line. Similarly, although FIG. 1 illustrates the use of carded fibrous webs both above and below the net 10, only a single fibrous web such as web 22 can be employed or more than two fibrous webs can be employed. Moreover, it will be apparent to the skilled artisan that fibrous webs can be manufactured and supplied by other well known processes such as air-laying and the like.

The hydroentanglement station 40 is a preferred process step for securing the elastomeric net 10 to one or more fibrous webs 22, 34. However, in other preferred embodiments of the invention, the fibrous webs 22 and/or 24 can be secured to elastomeric net 10 by lamination including solvent-based adhesive and/or thermal adhesive lamination, needling and/or other well known textile processes.

The heated calender rolls 56 and 58 can, in other embodiments of the invention, be replaced by other thermal activations zones, for example in the form of a through-air bonding oven or in the form of a microwave or other RF treatment zone. An especially preferred through-air bonding or through-air drying treatment zone employs support screens both above and below the fabric which contact both surfaces of the fabric during passage through the oven. The screens are advantageously metallic screens resulting in conductive heating of both fabric surfaces by contact with the upper and lower metal screens respectively. Other heating stations such as ultrasonic welding stations can also be advantageously used in the invention. Such conventional heating stations are known to those skilled in the art and are capable of effecting substantial heating of the fabric sufficient for thermal activation of binder fibers when such fibers are incorporated into the fabric.

As indicated previously, nonwoven webs other than carded webs are also advantageously employed in the production of fabrics according to the invention. Nonwoven staple webs can be formed by air laying, garnetting, wet laying, and similar processes known in the art. Spunbonded webs which are extensible in the cross-machine direction because of little or no filament-to-filament bonding can be substituted for either or both of the carded webs illustrated in FIG. 2 and/or can be used in combination with one or both of the carded webs. Similarly meltblown webs which are extensible in the cross machine direction can be substituted for and/or used in conjunction with either of carded webs 22 and 34 shown in FIG. 2.

Figure 3:
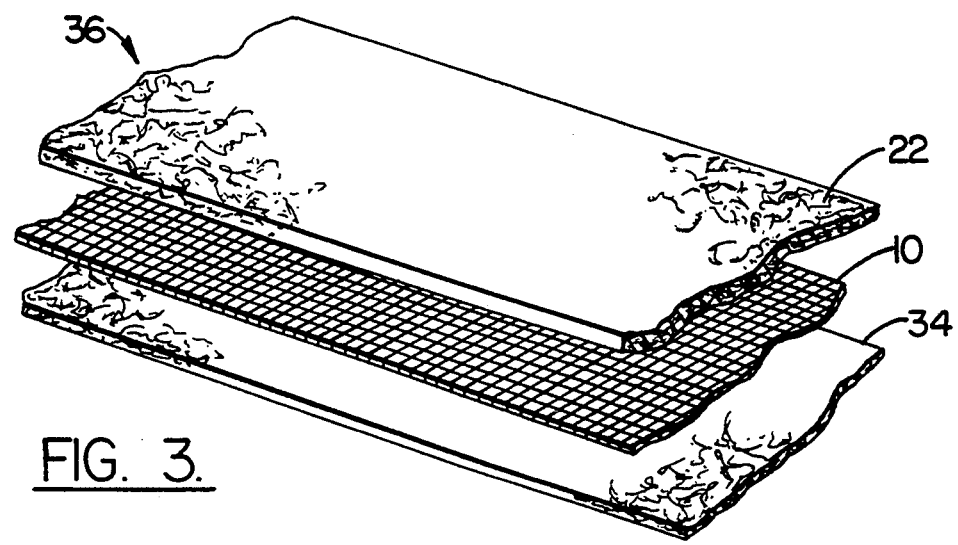
FIG. 3 is an exploded view of one preferred fabric according to the invention.

FIG. 3 illustrates an exploded view of the three-layered structure 36 of FIG. 2 prior to hydroentanglement. Each of webs 22 and 34 include staple and/or natural fibers such as fibers formed from polyester, polyolefins such as polypropylene or polyethylene, nylon, acrylic, modacrylic, rayon, cellulose acetate, biodegradable synthetics such as a biodegradable polyester, aramide, fluorocarbons, polyphenylene sulfide staple fibers and the like. Preferred natural fibers include wool, cotton, wood pulp fibers and the like. Blends of such fibers can also be used. In addition, all or a portion of the staple fibers can be glass, carbon fibers and the like.

The webs 22 and 34 can also include binder fibers in an amount of between about 5 and about 50 wt. %. Binder fibers are known in the art and include fibers made from low melting polyolefins such as polyethylenes; polyamides and particularly copolyamides; polyesters and particularly copolyesters; acrylics and the like. The binder fibers, when used, preferably have a lower activation temperature then the melting point of the net. In the case that the binder fibers activate above the glass transition temperature of the hard segment of the thermoplastic elastomer contained in the net, then heating conditions are advantageously closely controlled to activate the binder fibers without degrading or deforming the net.

Particularly preferred binder fibers include bicomponent and multi-component fibers such as sheath/core, side-by-side, sectorized or similar bicomponent fibers wherein at least one component of the fiber is a low melting material such as polyethylene, a copolyester, a copolyamide or the like. Preferred bicomponent fibers have a melting temperature for the binder portion of the fiber in range of between about 100° and about 135° C. Such fibers include polypropylene/polyethylene and polyester/polyethylene sheath/core fibers and polyester/copolyester sheath/core fibers. One particularly preferred binder fiber is a copolyester/polyester sheath/core fiber having a melting point of about 110° C. commercially available from Hoechst-Celanese Corporation as "K-54".

As indicated previously, the fabrics of the invention can also incorporate spunbonded nonwovens including polyolefin, nylon, polyester, copolymers of the same and other webs as are known to those skilled in the art. Similarly, meltblown nonwovens including both elastomeric and non-elastomeric meltblown webs prepared from polyolefins, nylons, polyesters, random and block copolymers, elastomers and the like can also be included in fabrics of the invention.

Figure 4:
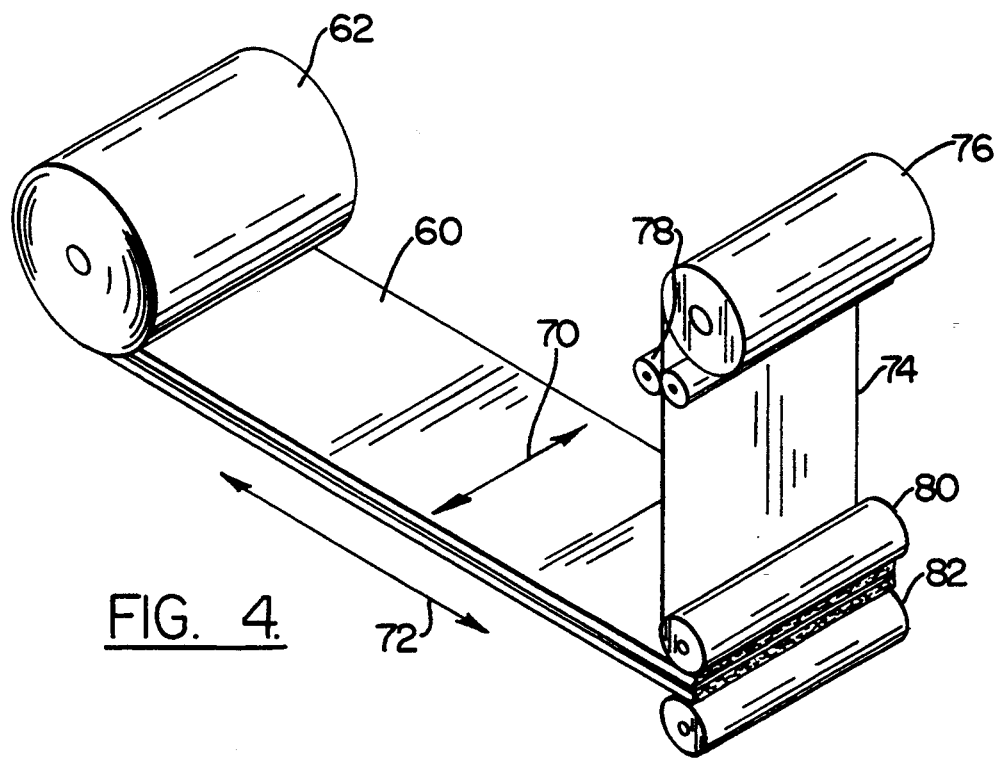
FIG. 4 is a schematic illustration of a process wherein a fabric of the invention is laminated to a second fabric or film layer.

FIG. 4 illustrates an exemplary end-use process for a fabric 60 of the invention. The fabric 60 is substantially elastic in the cross-machine direction as indicated by arrow 70 and is substantially non-extensible in the machine direction as illustrated by arrow 72. The fabric 60 can be supplied via a roll to a lamination process as illustrated in FIG. 4. A second film or fabric 74 is supplied from roll 76 for lamination with the fabric 60. An adhesive material may be applied to the film or fabric 74 via one or more rolls 78 by conventional apparatus known to the those skilled in the art. A pair of calender rolls 80 and 82, which may be heated, are used to bond the film or fabric 74 to the elastic fabric 60 of the invention.

As is apparent to the skilled artisan, during the lamination process illustrated in FIG. 4, the fabric 60 is subjected to tension in the machine direction. During a typical lamination process, if an elastic fabric is stretched due to elasticity, the film or fabric layer 74 will be gathered following relaxation of the laminate. In addition, as discussed below, when elastomeric materials are stretched during heating, for example, by contact with heated calender rolls 80 and 82, a failure of elastic properties can result.

FIG. 5 illustrates the results of thermal stress tests conducted on filaments of a styrenic elastomer having a denier per filament of 1283 (1426 dtex); a filament composed of poly(ethylene vinyl acetate) having a denier of 530 (589 dtex) and on a filament of linear low density polyethylene having a denier of 844 (937 dtex). Each of the filaments was subjected to a constant stress of 4.2 mg/den (37 μN/dtex) and subjected to different thermal environments. As seen in FIG. 5, the elastomeric filaments undergo substantial elongation even at room temperature (20° C.). At 70° C., the ethylene vinyl acetate filaments exhibit substantial elongation. At 90° C., the elastomeric filament was broken while the ethylene vinyl acetate filament was broken at 80° C. The filament composed of linear low density polyethylene, on the other hand, exhibited substantial stability even at a temperature of 100° C. It will be apparent that the stress employed in this series of tests (approximately 4 mg/den) is an extremely low stress. It will also be apparent that elastomeric filaments are highly unstable when subjected to the combination of even a low stress together with elevated with thermal treatment.

The data illustrated in FIG. 5 is set forth below, in Table 1 in tabular form.

TABLE 1

PERCENT ELONGATION VS. TEMPERATURE

| TEMPERATURE (°C.) | PERCENT ELONGATION | | |
|---|---|---|---|
| | STYRENIC ELASTOMER | EVA | LLDPE |
| 20 | 5.5 | 0.6 | 0.6 |
| 30 | 6.5 | 0.9 | 0.9 |
| 40 | 7.0 | 1.3 | 1.1 |
| 50 | 7.8 | 1.9 | 1.5 |
| 60 | 10.0 | 3.4 | 1.9 |
| 70 | 14.7 | 6.4 | 2.3 |
| 80 | 28.9 | 19.1 | 2.8 |
| 90 | 34.6 | Break | 3.5 |
| 100 | Break | Break | 4.4 |
| 110 | Break | Break | 6.1 |
| ADDITIONAL INFORMATION | | | |
| Filament denier | 1283 | 530 | 844 |
| Size dtex | 1426 | 589 | 937 |
| Stress mg/den | 4.21 | 4.23 | 4.23 |
| µN/dtex | 37.2 | 37.4 | 37.4 |

As is apparent from the data presented above, nonwoven fabrics with elastomeric materials in the machine direction are difficult to process. In the thermomechanical analysis test, above, the tension presented to the materials is extremely low and is lower than tensions typically achieved on forming and converting equipment. However, as is apparent from the above, even at room temperature and under this unrealistically low tension, elastomeric filaments still stretch 5–6%. In the processing and/or converting environment, such stretching can interfere with steps such as cutting and the like. However, with the elastomeric fabrics of the invention, the fabrics can be processed in the machine direction without stretching.

The following examples illustrate preparation of preferred fabrics according to the invention:

EXAMPLE 1

In Example 1, a process-stable nonwoven fabric was made by using a rectangular net with 18 strands/inch in the MD and 9 strands/inch in the CD. This net had linear low density polyethylene in the MD and elastomer in the CD. The elastomer in the CD is a styrenic triblock thermoplastic rubber consisting of SIS and SBS rubber compounded with a low molecular weight polystyrene. The nonwoven composite was made by hydroentangling a polyester fiber blend consisting of 70% by weight Type 183, 1.5 dpf×1.5" PET from Hoechst Celanese and 30% by weight Type K-54 2.0 dpf×1.5" bicomponent fiber also from Hoechst Celanese. After entangling, the product was through-air bonded at 320° F. Note that this bonding step could not have been performed if the product was not process stable under heat and tension. The resulting product was soft, had good CD elasticity, and was resistant to fiber pilling and fuzzing.

EXAMPLE 2

In Example 2, a process-stable nonwoven fabric was made by using a rectangular net with 12 strands/inch in the MD and 12 strands/inch in the CD. In the MD, this net was 80% low density polyethylene (copolymer) and 20% ethylene-vinyl acetate copolymer. An SIS and SBS rubber compound blended with low molecular weight polystyrene was used as the elastomer.

The product was entangled with a fiber blend consisting of 70% by weight Type 182, 2.2 dpf×1.5" Polypropylene from Hercules, and 30% by weight Type K-54 2.0 dpf×1.5" bicomponent fiber from Hoechst Celanese.

The resulting product had a very soft hand and good CD stretch.

EXAMPLE 3

In example 3, a process-stable non-woven fabric was made just like example 2. After forming the web, however, the product was subsequently calender bonded. A micro-gapped, open-nip calender with two smooth rolls was used to bond the fibers with minimal effect on the net.

EXAMPLES 4,5 AND 6

Examples 4, 5 and 6 were all made in a similar fashion. The difference between examples is the net used. Examples 3 used an 18×3 net, example 4 used an 18×5 and example 5 used an 18×7. All nets had a 50/50 blend of EVA with a low density polyethylene (copolymer) as the MD resin, and for the CD resin, the same SIS-SBS rubber compound used in the previous examples.

EXAMPLE 7

Example 7 was made by taking a 15×8 net. This net had a rectangular (rather than circular) MD strand geometry. The net consisted of an 80/20 blend of a low density polyethylene (copolymer) with EVA as the MD resin. Again for the CD resin the same SIS-SBS rubber compound was used as in the previous examples.

This product was entangled with a fiber blend consisting of 70% by weight 1.0 dpf×1.5" polypropylene staple, and 30% by weight Type K-54 2.0 dpf×1.5" bicomponent fiber from Hoechst Celanese. A microgapped, open-nip calender with two smooth rolls was used to bond the fibers with minimal effect on the net.

The invention has been described in considerable detail with reference to its preferred embodiments. It will be apparent however that the invention is susceptible to numerous modifications and variation without departure from the spirit and scope of the invention as described in the foregoing specification and defined in the appended claims.

We claim:

1. A process stable composite elastic fabric of predetermined width and having a length substantially greater than said width, said width defining the cross-machine direction of said fabric and said length defining the machine direction of said fabric, said composite fabric comprising:
   at least one fibrous layer; and
   a net combined with said fibrous layer, said net comprising a plurality of continuous machine direction strands oriented in substantially the machine direction of said fabric and a plurality of cross-machine direction strands oriented in substantially the cross-machine direction of said fabric, said machine direction strands having an extensibility of less than about 5% under an applied stress of 5 mg/den at temperatures of up to 70° C. and said cross-machine direction strands being elastic.

2. The process stable fabric of claim 1 wherein said cross-machine direction strands comprise at least about 20 wt. % of a thermoplastic elastomer.

3. The process stable fabric of claim 2 wherein said net is combined with said fibrous web by hydroentangling.

4. The process stable elastic fabric of claim 1 wherein said fibrous web comprises staple fibers.

5. The process stable fabric of claim 4 wherein said staple fibers are selected from the group consisting of polyolefins, polyesters, nylon, cotton, wood pulp and wool fibers.

6. The process stable fabric of claim 5 wherein said staple fibers comprise binder fibers in an amount of at least 5 wt. %.

7. The process stable fabric of claim 1 wherein said fibrous web is combined with said elastic net by adhesive lamination.

8. The process stable fabric of claim 7 wherein said fibrous web includes binder fibers.

9. The process stable fabric of claim 8 wherein at least a portion of said binder fibers are thermally activated to bond said hydroentangled fabric into a coherent, substantially unitary structure.

10. A process stable composite elastic fabric of predetermined width and having a length substantially greater than said width, said width defining the cross-machine direction of said fabric and said length defining the machine direction of said fabric, said composite fabric comprising:

at least one fibrous layer comprising staple fibers; and
a net combined with said fibrous layer, said net comprising a plurality of continuous machine direction strands oriented in substantially the machine direction of said fabric and plurality of cross-machine direction strands oriented in substantially the cross-machine direction of said fabric, said machine direction strands being non-elastic and said cross-machine direction strands comprising at least about 20 wt. % of a thermoplastic elastomer;

whereby said fabric is elastic in the cross-machine direction and is substantially non-extensible in the machine direction having an extensibility of less than about 5% under an applied stress of temperatures of up to 70° C.

11. The process stable fabric of claim 10 wherein said fibrous layer comprises staple fibers and wherein said net is combined with said fibrous layer by hydroentanglement.

12. The process stable composite elastic fabric of claim 11 wherein said net comprises polyolefin strands oriented in the machine direction.

13. The process stable composite elastic fabric of claim 12 wherein said cross-direction strands of said net comprise a styrene-based thermoplastic elastomer in an amount of at least about 50 wt. %.

14. The process stable composite elastic fabric of claim 13 wherein said fibrous layer comprises at least about 5 wt. % binder fibers having been thermally activated to bond said hydroentangled fabric into a coherent, substantially unitary structure.

15. The process stable fabric of claim 14 wherein said staple fibers in said fibrous web are selected from the group consisting of polyolefins, polyesters, nylon, cotton, wood pulp and wool fibers.

16. The process stable fabric of claim 10 additionally comprising at least one spunbonded web combined with said fibrous layer and to said net.

17. The process stable fabric of claim 10 additionally comprising at least one meltblown web combined with said fibrous layer and said net.

18. The process stable fabric of claim 10 wherein said machine direction strands of said net comprise linear low density polyethylene.

19. The process stable fabric of claim 10 wherein said machine-direction strands of said net comprise an adhesive promoting additive.

* * * * *

UNITED STATES PATENT AND TRADEMARK OFFICE
CERTIFICATE OF CORRECTION

PATENT NO. : 5,431,991
DATED : July 11, 1995
INVENTOR(S) : Quantrille et al.

It is certified that error appears in the above-identified patent and that said Letters Patent is hereby corrected as shown below:

Column 1, line 9, before "now" insert -- , --;

Column 3, line 58, after "fabrics" delete "-";

Column 4, line 10, delete "Significant" and insert -- significant --;

Column 5, line 54, delete "Plasticst" and insert -- Plastics; --;

Column 6, line 33, delete "styreno" and insert -- styrene --;

Column 7, line 44, delete "Jets" and insert -- jets --;

Column 11, Table 1, please insert a horizontal line in the Table as shown below:

| Size | dtex | 1426 | 589 | 937 |
|---|---|---|---|---|

Column 11, line 65, after "the" delete ","; and

UNITED STATES PATENT AND TRADEMARK OFFICE
CERTIFICATE OF CORRECTION

PATENT NO.  : 5,431,991
DATED       : July 11, 1995
INVENTOR(S) : Quantrille, et al.

It is certified that error appears in the above-indentified patent and that said Letters Patent is hereby corrected as shown below:

Column 14, line 8, after "of" insert --5 mg/den at --.

Signed and Sealed this

Twenty-sixth Day of March, 1996

Attest:

BRUCE LEHMAN

Attesting Officer

Commissioner of Patents and Trademarks